United States Patent
Krocker et al.

(10) Patent No.: US 12,064,805 B2
(45) Date of Patent: Aug. 20, 2024

(54) METHOD AND DEVICE FOR ROLL SEAM WELDING CONTAINER SHELLS

(71) Applicant: Soudronic AG, Bergdietikon (CH)

(72) Inventors: Carsten Krocker, Bergdietikon (CH); Peter Taiana, Bergdietikon (CH)

(73) Assignee: SOUDRONIC AG, Bergdietikon (CH)

(*) Notice: Subject to any disclaimer, the term of this patent is extended or adjusted under 35 U.S.C. 154(b) by 849 days.

(21) Appl. No.: 16/607,727

(22) PCT Filed: Jan. 15, 2018

(86) PCT No.: PCT/CH2018/000002
§ 371 (c)(1),
(2) Date: Oct. 24, 2019

(87) PCT Pub. No.: WO2018/195674
PCT Pub. Date: Nov. 1, 2018

(65) Prior Publication Data
US 2020/0055108 A1    Feb. 20, 2020

(30) Foreign Application Priority Data

Apr. 28, 2017  (CH) .................................. 0578/17

(51) Int. Cl.
*B23K 11/06* (2006.01)
*B21D 51/26* (2006.01)
(Continued)

(52) U.S. Cl.
CPC .......... *B21D 51/2676* (2013.01); *B23K 11/06* (2013.01); *B23K 11/062* (2013.01);
(Continued)

(58) Field of Classification Search
CPC ....... B23K 11/06; B23K 11/093; B23K 11/08; B23K 11/0876; B23K 11/255; B23K 11/36
(Continued)

(56) References Cited

U.S. PATENT DOCUMENTS 4,075,451 A  *  2/1978  Wust ..................... B23K 11/04
                                                       219/51
4,160,892 A  *  7/1979  Opprecht ............. B23K 11/063
                                                       219/83
(Continued)

FOREIGN PATENT DOCUMENTS

EP    0 566 844 A1    10/1993
EP    2 243 584 A1    10/2010
(Continued)

OTHER PUBLICATIONS

International Search Report for International Application No. PCT/CH2018/000002 dated Apr. 11, 2018.

*Primary Examiner* — Phuong T Nguyen
(74) *Attorney, Agent, or Firm* — McCormick, Paulding & Huber, PLLC

(57) ABSTRACT

A welding installation with a calibration tool is provided in a device for producing container shells. The force exerted by the container shells on the calibration tool is measured and evaluated as information for the overlapping width of the respective container shell. This allows adjusting the calibration tool during configuration of the device and allows the removal of container shells welded with too large or too small overlapping during production of container shells.

11 Claims, 3 Drawing Sheets

(51) Int. Cl.
    *B23K 11/087* (2006.01)
    *B23K 11/25* (2006.01)
    *B23K 11/36* (2006.01)
    *B23K 31/02* (2006.01)

(52) U.S. Cl.
    CPC ........ *B23K 11/063* (2013.01); *B23K 11/0876* (2013.01); *B23K 11/255* (2013.01); *B23K 11/36* (2013.01); *B23K 31/027* (2013.01)

(58) Field of Classification Search
    USPC .......................................................... 219/64
    See application file for complete search history.

(56) References Cited

U.S. PATENT DOCUMENTS

| | | | |
|---|---|---|---|
| 4,573,359 A | 3/1986 | Carstensen | |
| 4,615,220 A * | 10/1986 | Johansson | G01L 1/20 73/789 |
| 4,714,816 A * | 12/1987 | Pazzaglia | B23K 11/257 219/81 |
| 5,122,629 A | 6/1992 | Stieger | |
| 5,313,041 A | 5/1994 | Levy et al. | |
| 5,335,422 A | 8/1994 | Ferguson | |
| 5,787,583 A * | 8/1998 | Wolf | F02M 51/0682 29/888.03 |
| 5,841,094 A * | 11/1998 | Baumgartner | B23K 11/257 219/83 |
| 5,927,046 A * | 7/1999 | Martin | B29C 66/92651 53/DIG. 2 |
| RE36,612 E * | 3/2000 | Fukushima | B23K 11/087 219/83 |
| 2010/0272542 A1 | 10/2010 | Mueller et al. | |
| 2014/0169914 A1* | 6/2014 | Mueller | B23K 11/066 413/1 |
| 2014/0360279 A1 | 12/2014 | Jenkins | |
| 2015/0076117 A1 | 3/2015 | Neugebauer et al. | |
| 2015/0367440 A1 | 12/2015 | Dieterich et al. | |
| 2020/0055108 A1 | 2/2020 | Krocker et al. | |

FOREIGN PATENT DOCUMENTS

| | | |
|---|---|---|
| JP | 855-160281 U | 11/1980 |
| JP | 102-89578 A | 3/1990 |
| JP | 60-37861 B2 | 12/2016 |
| TW | 201436909 A | 10/2014 |
| TW | 1549770 B | 9/2016 |
| WO | 2018/195674 A1 | 11/2018 |

* cited by examiner

METHOD AND DEVICE FOR ROLL SEAM WELDING CONTAINER SHELLS

CROSS REFERENCE TO RELATED APPLICATIONS

This application is a National Stage application of International Patent Application No. PCT/CH2018/000002, filed Jan. 15, 2018, which claims the priority of Swiss patent application 0578/17, filed Apr. 28, 2017, the disclosure of which is incorporated herein by reference in its entirety.

TECHNICAL FIELD OF THE INVENTION

The invention relates to a method for roll seam welding container shells with a calibration tool. Furthermore, the invention relates to a device for roll seam welding container shells.

BACKGROUND OF THE INVENTION

Devices and methods of the abovementioned type are known. Generally, an as small as possible overlapping of the metal sheet edges of the metal sheet rounded to the shape of a container shell is sought when welding the seam of container shells, in order to yield a compact seam. However, there is the danger that the metal sheet edges deviate laterally and glide away from one another due to the pressure of the welding rollers of the resistance welding machine and due to the softening of the metal sheet of the container shell at the welding location within the overlapping. In order to avoid this, the shell is guided through a calibration tool at the welding location, which is formed by profile rollers arranged in a wreath-shaped way, and is therefore also called calibration wreath. The profile rollers contact the circumference of the container shell around the latter substantially seamlessly in order to avoid that the metal sheet of the container shell deviates outward as a cause of the pressure of the welding rollers. The calibration wreath normally consists of two halves which are adjustable with respect to one another and is a tool designed for a certain container shell diameter. The initial overlapping of the metal sheet edges of each container shell is determined by the head part at the end of the so-called Z-rail during transport to the welding machine. The Z-rail assumes the guiding of the rounded container shells which are not yet welded into the lower arm of the machine, as known. This lower arm also supports the lower welding roller. There is no guiding of the metal sheet edges of the container shell in the lower arm between the head part or the end of the lower arm, respectively, and the so-called "welding plane" defined by the welding rollers. The contact zone of the calibration tool with the container shells, the so-called "plane" of the calibration tool or calibration wreath, respectively, is arranged at a close distance before the welding rollers in order to stabilize the position of the overlapping metal sheet edges of the respective container shell even before the welding plane. The force exerted by the calibration wreath on the container shell causes a counter-force generated by the elastic deformation of the container shell material when the respective container shell enters the calibration tool, because the overlapping prescribed by the head part is smaller to a certain extent than the overlapping prescribed for welding by the calibration tool. The seam quality during the welding of container shells depends on many parameters, such as the overlapping set in the head part, the geometry of the calibration wreath and its distance from the welding plane, the mutual height offsets between the welding rollers, the calibration wreath and the head part, the welding force as well as the welding current frequency, the welding current shape and the welding power. The range of these parameters allow multiple possibilities to generate a good welding seam, wherein experience of the operator of the device many times plays an important role. If the latter or if boundary conditions change, e.g. the metal sheet quality, the search for good settings by means of producing and testing test shells may be difficult and lengthy. It has been noticed that many times in these cases a too high calibration force is set, which is compensated with a higher welding force and higher welding current. This may lead to the situation that the production process for the container shells doesn't run stable in the long term anymore and that high wear of the device occurs.

A variety of disturbance values may have an influence on the welding of the longitudinal seam during the production of container shells. EP 2 243 584 A1 discloses such disturbance values and assigns them possibilities for their compensation. Particularly, geometry errors of the metal sheets or errors during cutting the metal sheet, respectively, shall be named as disturbance value. In order to detect geometry errors—apart of other possibilities—a force measurement on a calibration roller in the calibration tool of the resistance welding machine is also considered and the corresponding compensation measures are output in order to allow the production of a can shell despite the geometry error.

SUMMARY

It is the objective of the invention on the one hand to simplify the settings of the device for producing container shells and on the other hand to be able to detect potentially badly welded container shells due to an overlapping error in operation during the production of a high volume of container shells.

This objective is reached with a method of the aforementioned type in such a way that the measured force is evaluated as information for the overlapping width of the can shell.

This allows in an easy way to set the calibration force in such a way that an overlapping is reached, which is neither too small not too large, wherein this can also be carried out by an operator with little experience. For the installation it is possible in this way to reach suitable settings of the production device with few test shells and to find settings which avoid unnecessary wear and run reliably during production. During production it is possible to determine container shells in case of which the overlapping is beyond desired values and to remove the respective container shells from the series after welding.

Preferably, the force exerted on multiple calibration rollers is measured and particularly the force exerted on all calibration rollers is measured. This is done preferably in such a way that the calibration tool consists of two parts, each of which carries calibration rollers, and wherein the force exerted by the respective shell on the two parts is measured. For this, a yoke connecting the two parts may be provided and the deformation of the yoke is measured and used as measured force signal.

A particularly easy way of setting of the production device and an easy recognition of potentially badly welded container shells results when the exceedance or shortfall of a predefined threshold value is used as information for the measured force signal, that the overlapping width of the shell is beyond a setpoint.

As explained, the method is particularly carried out in such a way that it is applied to test container shells and is used for setting the calibration tool before series production of container shells is initiated. Furthermore, the method is particularly carried out in such a way that it is applied to container shells during series production of container shells and container shells with an overlapping width which is beyond a predefined lower or upper threshold value are removed from the series after welding.

The invention further has the objective to provide a production device for container shells, which has a simple way of setting for the production of container shells and on the other hand to avoid release of potentially badly welded container shells due to an overlapping error in operation during the production of a high volume of container shells.

This objective is reached with a device of the aforementioned type in such a way that a signal reflecting the measured force is generated by the force measurement installation and is evaluated in the device as information for the overlapping width of the can shell.

Such a device allows in an easy way for an operator with little experience to set the calibration force in such a way that an overlapping is reached, which is neither too small nor too wide. In this way it is possible to reach suitable settings of the production device with few test shells and to find settings which avoid unnecessary wear and run reliably during production. During production it is possible to determine container shells in case of which the overlapping is beyond desired values and to remove the respective container shells from the series after welding.

The force measurement installation may be adapted to evaluate the signal or the device may have a welding monitor connected to the force measurement installation and may be adapted to evaluate the measured force signal. It is also possible that the device has a controller device connected to the force measurement installation and adapted to evaluate the measured force signal.

Preferably, the force measurement installation is adapted to measure the force exerted on multiple rollers of the calibration tool and particularly the calibration tool is formed by multiple parts, particularly two parts, and the force measurement installation is adapted to measure the force acting between the parts of the calibration tool. This is preferably carried out in such a way that the device has a yoke connecting the parts of the calibration tool and the force measurement installation is adapted to measure the deformation of the yoke.

The invention has further the objective to provide a calibration tool which avoids said disadvantages in a production device of container shells. Such a calibration tool makes it possible to upgrade an existing production device in a way such that said advantages are reached.

This objective is reached with a calibration tool according to the present invention.

BRIEF DESCRIPTION OF THE DRAWINGS

Further embodiments, advantages and applications of the invention result from the dependent claims and from the now following description by means of the figures. Thereby it is shown in:

DESCRIPTION OF THE PREFERRED EMBODIMENTS

Figure 1:
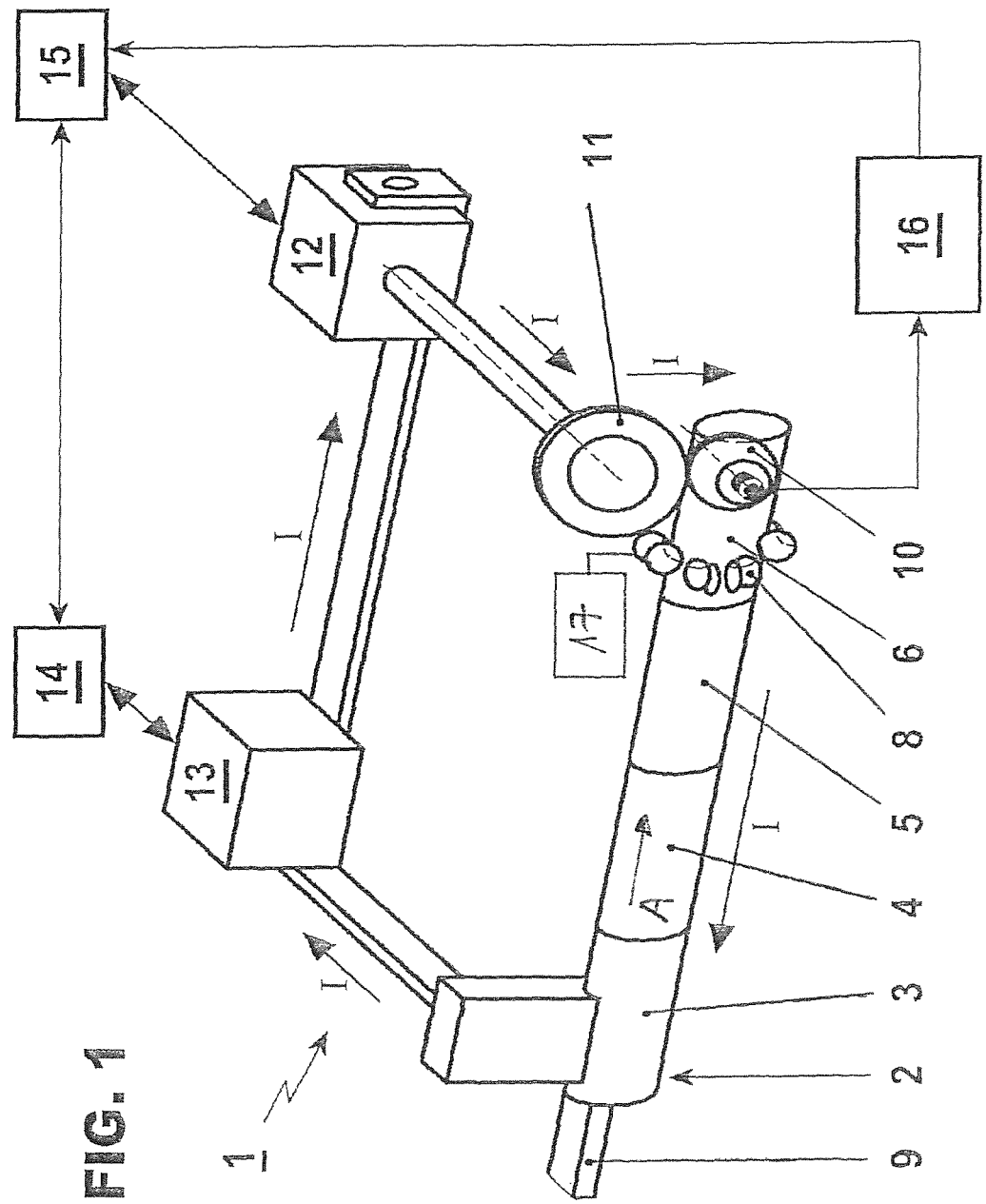
FIG. 1 shows a broadly schematically a part of a device for producing container shells.

FIG. 1 shows the approach for producing container shells which are welded with a longitudinal seam with overlapping edges. The device 1 has a resistance welding machine with welding rollers 10 and 11. The bottom welding roller 10, which is surrounded by the respective shell, is therefore in fact not visible in the figure; it is however shown in the drawing for a better explanation, as if the shell would be transparent. This welding roller 10 is supported on the not shown lower arm of the welding machine. The top welding roller 11 is driven and supported in a pivotable way and the force pressing it on the bottom welding roller is adjustable in order to allow adjustment of the welding force. The drive and the welding force adjustment by a corresponding arrangement are shown with box 12. Normally, an intermediary wire electrode is provided for welding, which runs over the welding rollers. This is known to the skilled person and is not shown here due to simplification of the drawing. The succession 2 of container shell blanks 3 to 6, which have been formed by a not shown rounding machine of the device 1, is transported along the so-called Z-rail 9 of the transport installation of the device 1 to the welding machine in direction towards the welding rollers 10 and 11. The Z-rail is only hinted in FIG. 1 and for simplification reasons it is not shown how the edges of the container shell blanks are guided in the Z-rail. However, this is known to the skilled person. The container shell blanks of succession 2 are transported along the Z-rail 9 with little distance from one another, wherein the transport device known to the skilled person is not shown here—apart from the Z-rail 9. The calibration tool 8 is provided before the welding rollers 10, 11, which is only shown schematically in FIG. 1. The Z-rail 9, which makes the longitudinal edges of the container shells, which shall be welded, overlap, and the calibration tool 8 prepare the container shell blanks for welding in such a way that the edge position for welding is correct and is maintained during the welding process. The longitudinal seam of the container shell 6 is welded in FIG. 1 and this shell subsequently leaves the welding machine and is further processed to a finished container by steps known to the skilled person. The container shells 3, 4 and 5 are still blanks with not yet welded, overlapped edges.

Instead of an overlapping welding of overlapping edges it would also be possible to perform a butt welding of edges bordering one another, wherein in this case the Z-rail is replaced by a so-called S-rail.

The bottom welding roller 10 is normally rotatable about a fixed rotation axis, the top welding roller 11 is rotatably supported in a springy and driven way and allows setting the welding force by means of the described drive installation and welding force setting installation 12, which is connected to the controller 15 of the welding machine. The welding current I provided by a welding current source 14 with a welding transformer 13 is guided to the top welding roller 11 via current rails, it flows to the bottom welding roller 10 via the edges of the container shell to be welded, and is guided again to the welding current transformer 13 via the not shown lower arm of the welding machine and further current rails. The mentioned controller 15 is provided for controlling the device and particularly its welding machine. A so-called welding monitor 16, which can be a part of the controller 15, can collect data of the welding and transmit it to the controller 15. This is known. According to the present invention, a force measurement installation 17 is provided, which measures the force exerted by the respective can shell on at least one calibration roller. And it is provided that the measured force is evaluated as indicator for the overlapping width of the respective can shell. The evaluation of the measured force can take place in the force measurement installation 17 itself and may be displayed if necessary. The force measurement installation can also be connected to the welding monitor 16, such that the measured force signal is evaluated in the welding monitor and is displayed if necessary. The force measurement installation may also be connected to the controller 15, such that the measured force signal is evaluated in the controller 15 and is displayed if necessary.

Figure 2:
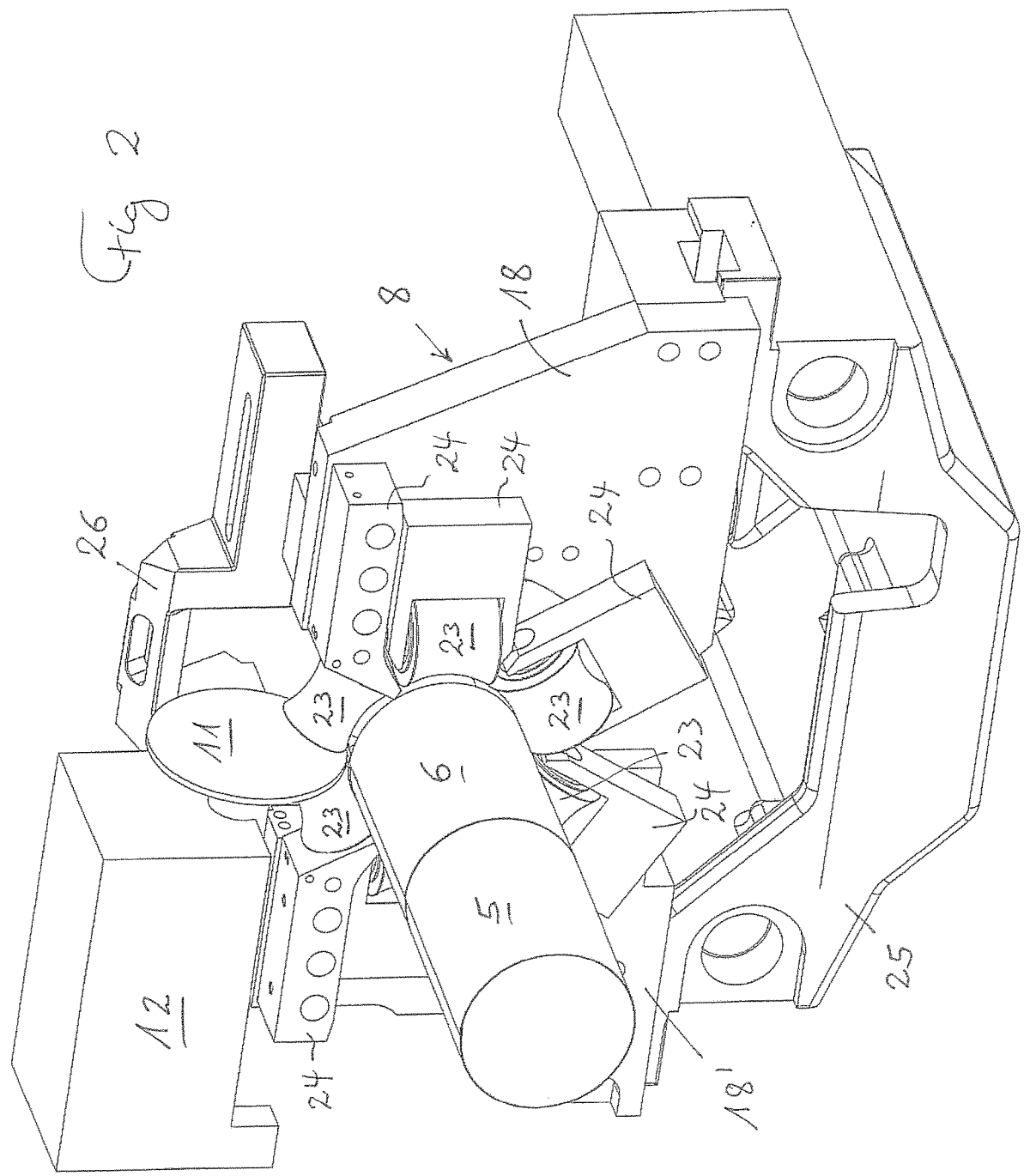
FIG. 2 shows an illustrative view of a calibration tool as seen in transport direction.
Figure 3:
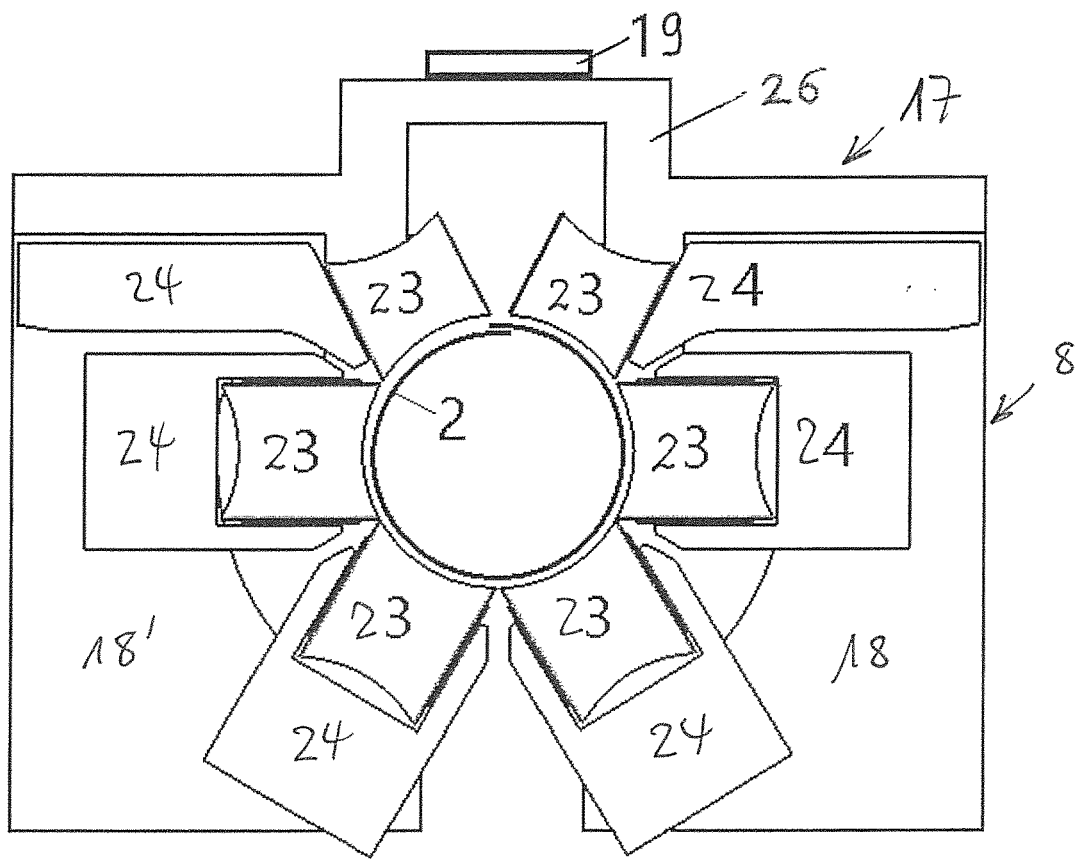
FIG. 3 shows a schematic view of a calibration tool and the force measurement installation.

FIG. 2 shows in an illustrative view the calibration tool 8 with the calibration rollers 23, each of which are rotatably supported in bearings 24. The bearings 24 are supported on a frame 25 of the welding machine of the device 1. FIG. 2 only shows the top welding roller 11 and two container shells 5, 6 are shown, wherein the front can shell, as seen in transport direction, is shown shortly before entering the calibration tool. In the example of FIG. 2 the calibration tool is a two-piece calibration tool 8 with the parts 18, 18'. A preferred embodiment is shown for the force measurement installation 17, for which the later has a yoke 26 connecting the two parts 18, 18' of the calibration tool and at which yoke the force measurement is carried out by determining the deformation of the yoke, which depends on the force exerted by each shell on the calibration tool. This preferred embodiment with both parts 18 and 18' of the calibration tool 8 with the yoke 26 connecting them is better visible in the simplified FIG. 3. In this example the yoke 26 carries a sensor 19 in the middle, e.g. a sensor with a wire stain gauge connected to the yoke in such a way that it transforms the deformation of the yoke in a signal representing the force exerted on the calibration tool by the can shell. The signal may be an electrical signal or, as the case may be, an optical signal, depending on the embodiment of the sensor. The term sensor is understood here as all means able to determine the force-dependent deformation of the yoke—or of another component of the calibration tool or of a component arranged on the calibration tool. Instead of wire stain gauges such means may also be optical sensors or magnetic sensors or sensors with a sound-wave-based measurement. Such sensors for measuring the deformation of the yoke or for measuring the force application on at least a calibration roller are known to the skilled person and are not explained in more detail here. The signal of the sensor can be evaluated in the force measurement installation itself and in this case the force measurement installation passes on the already evaluated signal or displays the signal, e.g. according to FIG. 4. The signal may also be passed on for evaluation via a not shown line, particularly to the welding monitor 16 and/or the controller 15 and may also be displayed there, e.g. equally according to FIG. 4.

According to the invention, the measured force signal is used as input for the overlapping width of the respective can shell which has triggered the measured force signal in the calibration tool. Thereby it is not necessary that the real overlapping width is given as number in millimeters. It is sufficient that the measured force signal provides the overlapping width as input, which allows specifying if the overlapping width is in a range which is suitable for welding the longitudinal seam of the shell. Or, if the overlapping width is outside this range.

Figure 4:
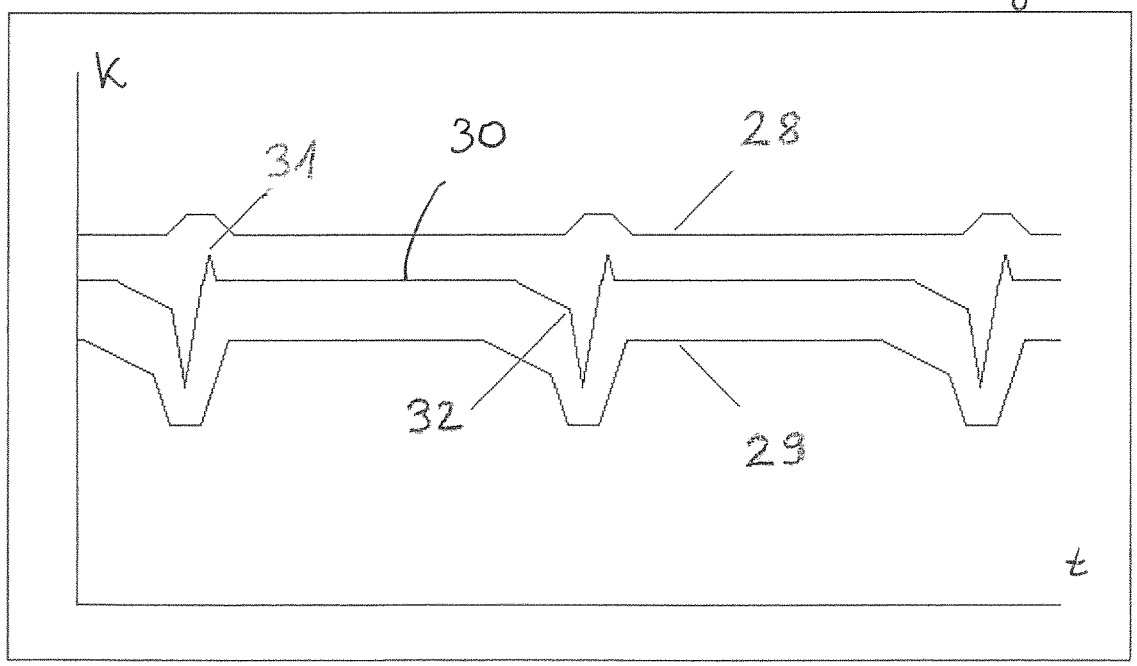
FIG. 4 shows a representation of the force development over time or over consecutive container shells in the calibration tool.

FIG. 4 shows an example for the measured force development 30 during passage of the container shells through the calibration tool. The force development 30 is used as input for the overlapping width for the respective can shell and a boundary value 28 and a boundary value 29 are shown, wherein the overlapping width or the measured force signal, respectively, shall be within these boundary values. A force spike 31 can be detected for each can shell when it enters the calibration tool and a force drop 32 when it exits the calibration tool. The connection between force spike and force drop results from the respective deformation of the yoke in the small distances between the individual container shells. A display installation may be provided, which shows a representation for the operator of the device according to FIG. 4 or in a similar way. The horizontal axis either indicates the time t or the welding seam length. The force can be indicated vertically. Such a display can be provided for the force measurement installation 17 and/or for the welding monitor 16 and/or for the controller installation 15. Instead of a graphical display of the force in the calibration tool and its preferred boundaries 28, 29, only a simplified display may also be provided, indicating the operator if the calibration force shall be increased or decreased or if the opening of the calibration tool shall be decreased or increased, respectively. The illustration according to FIG. 4 or other illustrations of the calibration force measurement serve for finding fast a good setting of the device during commissioning of the device 1 and particularly to avoid a too high calibration force or a too large overlapping, or a too small calibration force and therefore too little overlapping.

In operation, no illustration like the one of FIG. 4 is required for the series production of shells. However, it is determined for each shell by the welding monitor and/or the controller 15 or potentially only by the force measurement installation 17, if its measured force value at the calibration tool 8 is within the predefined limits. If this was not the case for a shell, it can be ejected from the further production line after welding.

The force information or the information about the overlapping width, respectively, determined according to the invention may therefore be used in different ways. On the one hand, it is possible to determine during series production of container shells for each can shell, if the force development caused by it or its overlapping signal, respectively, is within the predefined limits. On the other hand, the information about the overlapping width can be used during configuration of the device 1 before the initiation of the production. If the information about the overlapping width is beyond the limits 28 or 29, the person configuring the device 1 may set the calibration tool in a known way such that the overlapping width is within the limits. This is performed with test shells. For configuring the calibration tool, particularly the two parts of the tool may be moved towards one another or away from one another and then fixed in the respective position. This is—as mentioned—known to the skilled person and is not explained in more detail here.

While preferred embodiments of the invention are described in the present patent application, it is clearly noted that the invention is not limited to these embodiments but can also be carried out in different ways within the scope of the following claims.

What is claimed is:

1. A method for producing container shells, wherein rounded shells are transported from a transport installation to a roll seam welding machine having welding rollers and the shells pass through a calibration tool with a plurality of calibration rollers arranged in a wreath-like array before the welding rollers of the roll seam welding machine, wherein a sensor measures the force exerted by the respective shell on the calibration rollers of the calibration tool and the measured force is evaluated as information for the overlapping width of the shell, characterized in that the calibration tool comprises two parts disposed respectively on two opposite sides of the calibration tool and a deformable yoke connecting the two parts together, one of the two parts supporting one set of the calibration rollers fixed in position on one of the two parts and not movable in or out independently of the one of the two parts, and the other of the two parts supporting another set of the calibration rollers fixed in position on the other of the two parts and not movable in or out independently of the other of the two parts, such that forces exerted by a container shell on the calibration rollers are transmitted through the rollers and two parts to deform the yoke connecting the two parts together, and wherein the sensor detects the deformation of the yoke as a measure of the force exerted by the respective container shell on the two parts and sets of calibration rollers.

2. The method according to claim 1, wherein the exceedance or shortfall of a predefined threshold value of the measured force is used as information indicative that the overlapping width of the shell is beyond a setpoint.

3. The method according to claim 1, wherein the method is applied to test container shells and is used for adjusting the calibration tool before initiating the series production of container shells.

4. The method according to claim 1, wherein the method is applied to shells during series production of container shells and shells with an overlapping width beyond a predefined lower or upper threshold are removed from the series after welding.

5. A device for producing container shells from blanks, comprising a transport device for transporting rounded shells and a roll seam welding machine, in which the blanks with overlapping edges are welded by means of welding rollers of the roll seam welding machine, wherein the device has a calibration tool with a plurality of calibration rollers arranged in a wreath-like array, which is arranged in transport direction before the welding rollers of the roll seam welding machine, and which has a force measurement installation, by means of which, measurement and evaluation of the force exerted by the respective container shell on the calibration rollers is carried out, wherein a signal reflecting the measured force is generated by the force measurement installation, and the signal is evaluated in the device as information for the overlapping width of the shell characterized in that
the calibration tool is formed by multiple parts connected together by a deformable yoke, the calibration rollers are fixedly connected to the multiple parts and not movable on the two respective parts, and the force measurement installation is adapted to sense the deformation of the yoke as a measure the force of a respective container shell passing between the parts of the calibration tool.

6. The device according to claim 5, wherein the force measurement installation is adapted to evaluate the signal.

7. The device according to claim 5, wherein the device has a welding monitor which is connected to the force measurement installation and adapted to evaluate the measured force signal.

8. The device according to claim 5, wherein the device has a controller connected to the force measurement installation and adapted to evaluate the measured force signal.

9. The device according to claim 5, wherein the force measurement installation is adapted to measure the force exerted on multiple calibration rollers of the calibration tool.

10. The device according to claim 5, wherein the multiple parts of the calibration tool are two parts.

11. A calibration tool for a production installation for roll seam welded container shells, wherein the calibration tool has a plurality of calibration rollers arranged in a wreath-like array, and a force measurement installation for measuring the force exerted by a container shell passing through the calibration tool onto at least one of the calibration rollers, wherein a signal reflecting the measured force is generated and output by the force measurement installation, or wherein a signal derived from the measured force is output by the force measurement installation, the force measurement installation is adapted to measure the force exerted on multiple calibration rollers of the calibration tool, the calibration tool is formed by two parts supporting separate sets of the calibration rollers fixed to the respective parts so as not to be movable on the two respective parts, and a deformable yoke connecting the parts together with the calibration rollers in the wreathe-like array, and the force measurement installation is adapted to measure the deformation of the deformable yoke as the force exerted by a container shell on the multiple calibration rollers of the calibration tool as the container shell passes between the separate sets of rollers.

\* \* \* \* \*